United States Patent
Dean et al.

[15] 3,686,347
[45] Aug. 22, 1972

[54] OXIDATIVE DEHYDROGENATION OF ORGANIC COMPOUNDS

[72] Inventors: Johnny C. Dean, Houston; Philip M. Colling, Rockport, both of Tex.

[73] Assignee: Petro-Tex Corporation, Houston, Tex.

[22] Filed: April 16, 1970

[21] Appl. No.: 29,291

Related U.S. Application Data

[63] Continuation-in-part of Ser. No. 671,236, Sept. 28, 1967, Pat. No. 3,567,793.

[52] U.S. Cl. ............ 260/680 E, 252/466 J, 252/470, 252/471, 252/472, 252/473, 252/474
[51] Int. Cl. ............................ C07c 5/18, B01j 11/22
[58] Field of Search ........ 253/471, 472, 62.56, 62.64, 253/680 E, 466 J, 470, 473, 474

[56] References Cited

UNITED STATES PATENTS

| | | | |
|---|---|---|---|
| 2,535,025 | 12/1950 | Schoenberg | 252/62.64 X |
| 2,980,619 | 4/1961 | Wetzel | 252/62.56 X |
| 3,027,327 | 3/1962 | Blank | 252/62.56 X |
| 3,066,103 | 11/1962 | Owen | 252/62.56 X |
| 3,146,205 | 8/1964 | Hegyl | 252/62.56 X |
| 3,050,572 | 8/1962 | Masterton et al. | 260/680 E |
| 3,338,952 | 8/1967 | Callahan et al. | 260/680 E |
| 3,420,912 | 1/1969 | Woskow et al. | 260/680 E |
| 3,526,675 | 9/1970 | Croce et al. | 260/680 E |
| 3,567,793 | 3/1971 | Colling et al. | 252/471 X |

*Primary Examiner*—Daniel E. Wyman
*Assistant Examiner*—W. J. Shine
*Attorney*—G. Baxter Dunaway

[57] ABSTRACT

Oxidative dehydrogenation of organic compounds in vapor phase utilizing metal ferrites formed in the presence of oxygen deficient atmospheres.

34 Claims, No Drawings

3,686,347

OXIDATIVE DEHYDROGENATION OF ORGANIC COMPOUNDS

CROSS REFERENCES

This application is a continuation in-part of Ser. No. 671,236, filed Sept. 28, 1967, now U.S. Pat. No. 3,567,793.

BACKGROUND OF THE INVENTION

1. Field of the Invention

The present invention relates to the oxidative dehydrogenation of organic compounds in the presence of a metal ferrite which has been prepared by a particular manner. The invention is particularly suitable for the dehydrogenation of hydrocarbons and preferred products are such as olefins or diolefins.

2. Description of the Prior Art

Organic compounds are commercially dehydrogenated by contacting the compound to be dehydrogenated at an elevated temperature preferably in the presence of catalysts. One method of dehydrogenation is known as oxidative dehydrogenation. According to this process, hydrogen released from the organic compounds reacts with oxygen to form water. One of the principal defects in oxidative dehydrogenation reactions is that quite often the reactions are unselective and oxygenated compounds are formed instead of the desired dehydrogenated compounds. These nonselective reactions are particularly evident when the compounds to be dehydrogenated contains three or more carbon atoms. For example, when methyl butene is reacted with oxygen, a variety of products other than isoprene may be produced such as hydrocarbons of shorter chain lengths and oxygenated dehydrocarbons. Also, combustion of the hydrocarbon may result in the formation of CO, $CO_2$ and water. It is one of the principal objects of this invention to provide a method of preparing a catalyst which will preferably dehydrogenate the organic compound to a product having the same number of carbon atoms at a high level of conversion and selectivity. Another object is to provide a method for preparing a catalyst having a long life. Other objects of this invention are to provide a method to prepare a catalyst that will allow a high overall input and a low contact time in the dehydrogenation zone, a catalyst that is not easily disintegrated, a catalyst that provides a low maximum temperature during dehydrogenation and good temperature during the reaction. It is therefore one of the principal advantages of this invention to provide a process wherein the organic compound is dehydrogenated preferably to a product having the same number of carbon atoms at a high level of conversion and selectivity. Another principal advantage is to provide a process wherein the catalyst has long catalyst life. Other advantages of this invention are to provide a process wherein substantial quantities of steam may be present in the dehydrogenation zone, and is also possible to have a high overall input and a low contact time in the dehydrogenation zone, a process wherein the catalyst is not easily disintegrated, a low maximum temperature during dehydrogenation and a process which has good control of reaction temperature.

SUMMARY OF THE INVENTION

Organic compounds are dehydrogenated by a process of oxidative dehydrogenation utilizing a metal ferrite in the dehydrogenation zone. The metal ferrite has been prepared by reacting the ingredients in a relatively oxygen deficient atmosphere. For example, manganese carbonate and iron oxide hydrate may be reacted in a nitrogen atmosphere.

DESCRIPTION OF THE PREFERRED EMBODIMENT(S)

The catalysts of this invention contain iron, oxygen and at least one other metallic element Me. The catalysts comprise ferrites. Ordinarily, the ionic radius of the second metallic ingredient(s) Me is small enough that the oxygen anions are not spread too far apart. That is, the element must be able to form a crystalline structure with the iron and oxygen.

A preferred type of catalyst of this type is that having a face-centered cubic form of crystalline structure. Examples of this type of catalyst are ferrites of the general formula $MeO \cdot Fe_2O_3$ where Me is a divalent metal cation such as $Mg^{++}$ or $Ni^{++}$. However, if the cations are large, such as $Sr^{++}$ (1.35A), the spinel structure may not occur and other types of ferrites having a hexagonal crystal of the type $SrO \cdot 6Fe_2O_3$ may be formed. These hexagonal ferrites are within the scope of the definition of catalyst of this invention.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient(s).

The catalysts may have the iron combined in crystalline structure with oxygen and more than one other metallic element, as mentioned above. For example, a preferred type of ferrite is that essentially or approximately of the formula, $MeFe_2O_4$, where Me represents a divalent metal ion with an ionic radius approximately between 0.5 and 1.1A, preferably between about 0.6 and 1.0A. In the case of simple ferrites, Me may be, e.g., one of the divalent ions of the transition elements as Mg, Ca, Sr, Ba, Cr, Mn, Co, Ni, Zn or Cd. However, a combination of these ions is also possible to form a ferrite such as $Ni_{0.5}Mg_{0.5}Fe_2O_4$ or $Ni_{0.25}Mg_{0.25}Mg_{0.75}Fe_2O_4$. Moreover the symbol Me may represent a combination of ions which have an average valency of two. However, it is essential that the crystalline structure contain iron and the metallic element other than iron.

Examples of catalysts are such as ferrites containing iron combined with at least one element selected from the group consisting of Mg, Zn, Ni, Co, Mn, Cu, Cd, Ca, Ba, Sr, Al, Cr, Ti, V, Mo, W, Na, K, Li Zr, Ag, Sn, Pb, Sb, Bi, Ga, Ce, La, Th, other rare earth elements and mixtures thereof (rare earths, e.g., Pm, Sm, Eu, Gd, Tb, Dy, Ho, Er, Tm, Yb, Lu) with a preferred group being Mg, Ca, Sr, Ba, Mn, Cr, Co, Ni, Zn, Cd, and mixtures thereof, and particularly preferred metals being Mg or Mn, such as magnesium ferrite, cobalt ferrite, nickel ferrite, zinc ferrite, barium ferrite, strontium ferrite, manganese ferrite, calcium ferrite, cadmium ferrite, silver ferrite, zirconium ferrite, and rare earth ferrites such as cerium ferrite or mixtures of ferrites. Examples of mixed ferrites are magnesium ferrite plus zinc ferrite, magnesium ferrite plus nickel ferrite, magnesium ferrite plus cobalt ferrite, magnesium ferrite plus nickel ferrite plus zinc ferrite, magnesium ferrite plus manganese ferrite. As explained above, these ferrites may be physical mixtures of the ferrites or may contain crystals wherein the different metallic atoms are contained in the same crystal; or a combination of physical mixtures and chemical combinations. Some examples of a chemical combination would be magnesium zinc ferrite, magnesium chromium ferrite, zinc chromium ferrite and lanthanum chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, by Richard M. Bozorth (D Van Nostrand Co., Inc., 1951), which disclosure is hereby incorporated by reference.

Although the catalysts may be broadly defined as containing crystalline structures of iron, oxygen and the second metallic ingredient(s), certain types of catalysts are preferred. Valuable catalysts were produced comprising as the main active constituent in the catalyst surface exposed to the reaction of gases, iron, oxygen and at least one element selected from the group of Mn, or Periodic Table Groups IIA, IIB or VIII such as those selected from the group consisting of magnesium, manganese, calcium, cadmium, cobalt, zinc, nickel, barium, strontium, and mixtures thereof. The Periodic Table referred to is the one of pages 400–401 of the Handbook of Chemistry and Physics (39th edition, 1957–58, Chemical Rubber Publishing Co., Cleveland, Ohio). Preferred catalysts have iron present as the predominant metal in the catalyst exposed in the reaction gases.

A preferred class of catalysts containing two second metallic ingredients are those of the basic formula $Me_aCr_bFe_{bgc}O_4$ where $a$ can vary within the range of about 0.1 to about 3, $b$ can vary from greater than 0 to less than 2 and $c$ can vary from greater than 0 to less than 3. Me can be any of the metallic ingredients, other than chromium, previously described, particularly Periodic Table Groups IIA, IIB, III and VIII. In particular, the metals from these groups that are desirable are Mg, Ba, La, Ni, Zn, and Cd.

The preferred compositions exhibit a certain type of X-ray diffraction pattern. The preferred compositions do not have any sharp X-ray diffraction reflection peaks as would be found, e.g., in a highly crystalline material having the same chemical composition. Instead, the preferred compositions of this invention exhibit reflection peaks which are relatively broad. The degree of sharpness of the reflection peak may be measured by the reflection peak band width at half height ($W\ h/2$). In other words, the width of the reflection peak as measured at one-half of the distance to the top of the peak is the "band width at half height". The band width at half height is measured in units of $°\ 2$ theta.

Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least $0.16\ °\ 2$ theta and normally will be at least $0.20\ °\ 2$ theta.*(*The powder diffraction patterns may be made, e.g., with a Norelco constant potential diffraction unit type No. 12215/0 equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 millamperes. An iron filter is used to remove K beta radiation. The detector voltage is 1660 volts and the pulse height analyzer is set to accept pulses with amplitudes between 10 and 30 volts only. Slits used are divergence 1°, receiving 0.006 inches and scatter 1°. Strip chart recordings for identification are made with a scanning speed of 1/4° per minute, time constant of 4 seconds and a full scale at $10^3$ counts per second. No correction is made for $K\ \alpha$ doublet or instrumental broadening of the band widths.) For instance, excellent compositions have been made with band widths at half height of at least 0.22 or $0.23\ °\ 2$ theta. The particular reflection peak used to measure the band width at one-half height is the reflection peak having Miller (hkl) indices of 220. (See, e.g., Chapter of Klug and Alexander, ibid.) Applicants do not wish to be limited to any theory of the invention in regard to the relationship between composition activity and band width.

Suitable preferred ferrites according to this invention are zinc ferrites having X-ray diffraction peaks within the $d$-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52, with the most intense peak being between 2.51 to 2.57; manganese ferrites having peaks at d spacings within or about 4.87 to 4.93, 2.97 to 3.03, 2.53 to 2.59, 2.09 to 2.15, 1.70 to 1.76, 1.61 to 1.67 and 1.47 to 1.53, (with other peaks) with the most intense peak being between 2.52 to 2.58 and with the main active constituent $MnFe_2O_4$; magnesium ferrites having peaks between 4.80 to 4.86, 2.93 to 2.99, 2.49 to 2.55, 2.06 to 2.12, 1.68 to 1.73, 1.58 to 1.63 and 1.45 to 1.50, with the most intense peak being between 2.49 and 2.55; the nickel ferrites having peaks within the d spacings of 4.79 to 4.85, 2.92 to 2.98, 2.48 to 2.54, 2.05 to 2.11, 1.57 to 1.63 and 1.44 to 1.49, with the most intense peak being within 2.48 to 2.54. The preferred manganese ferrites are those having the Mn predominately present as a valence of plus 2. Superior results have been obtained with the manganese ferrite compositions having peaks between 4.88 to 4.92, 2.98 to 3.03, 2.54 to 2.58, 2.10 to 2.14, 1.71 to 1.75, 1.62 to 1.66, and 1.48 to 1.52, with the most intense peak being between 2.54 to 2.58. These ranges will generally be within the d spacings of 4.88 to 4.92, 2.99 to 3.01, 2.54 to 2.57, 2.10 to 2.14, 1.71 to 1.75, 1.63 to 1.65 and 1.49 to 1.51 with the most intense peak being within the range of 2.54 to 2.57.

The catalysts may contain an excess of iron over the stoichiometric amount to form the ferrite. For example, in a ferrite of the type $MeFe_2O_4$ the stoichiometric amount of iron would be two atoms per atom of Me. The iron (calculate as $Fe_2O_3$) may be present in an amount of at least about 10 percent in excess of the stoichiometric amount and preferably may be present in an amount of at least 14 percent in excess. Suitable ranges of iron are from about 10 to 200 percent excess. Similarly, the catalyst may contain an excess of the Me over the stoichiometric amount required.

The compositions of this invention may also comprise additives such as disclosed in U.S. Pat. No. 3,270,080 and U.S. Pat. No. 3,303,238. Phosphorus, sulfur, silicon, boron or mixtures thereof are examples of additives. Excellent catalysts may contain less than 5 weight percent, and preferably less than 2 weight percent, of sodium or potassium in the surface of the catalyst.

Carriers or supports for the catalyst may be employed such as alumina, pumice, silica and so forth. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

It has now been discovered that improved metal ferrites may be formed by preparing the metal ferrite in a particular manner. It has also been discovered that these compositions of matter exhibit superior catalytic qualities such as for the oxidative dehydrogenation of organic compounds and for other uses. According to this invention the metal ferrite is formed in an atmosphere containing less oxygen than normally contained in air, such as less than 15 or 20 mol percent oxygen. By thus causing the reaction to take place in an atmosphere deficient in oxygen, the metal portion of the ferrite is less prone to be oxidized to a higher valence. The reaction to form the ferrite is preferably essential in the absence of oxygen preferably a non oxidizing atmosphere such as in an atmosphere of nitrogen or helium. The nature of a preferred atmosphere used to calcine or sinter the metal ferrite precursors is one in which the reactants and the metal ferrites produced are essentially inert. Thus the atmosphere would be an essentially inert atmosphere rather than either an essentially oxidizing atmosphere or an essentially reducing atmosphere, although small quantities of non-inert gases, e.g., either or both of oxidizing or reducing gases, or other reactive gases, i.e., about up to 3 mol percent would be acceptable in the preferred embodiment. As defined herein an inert atmosphere would include an atmosphere comprising essentially nitrogen, helium, neon, argon, krypton, xenon, radon, and mixtures thereof.

The appearance of reactive gases in the calcining atmosphere often occurs in large scale catalyst preparation when the exclusion of the atmospheric gases from conventional and available equipment is a practical impossibility. There is also the possibility of the buildup of reactive gases from the by-products as the calcining itself, e.g., carbon dioxide and steam. The presence of such reactive gases in the calcining atmosphere raises an important consideration to be observed in the operation of the process. If the atmosphere in the calciner were to remain stationary, that is, not removed or replenished during the calcining even for a considerable duration then 3 mol percent of the reactive gas in the atmosphere is acceptable. However, in practice it is more likely that the atmosphere will be renewed, that is, a moving atmosphere passing in around or over the catalyst.

In a moving or renewed atmosphere even low concentrations of reactive gases can have a cumulative effect so that, for example, a nitrogen atmosphere containing only 3 mol percent of oxygen which is passed through a reactor for 70 hours at 800° C over a catalyst consisting of manganese, iron and oxygen will produce a manganese ferrite essentially the same as if the calcining had been carried out in air. Thus the permissible concentration of reactive gases in a moving atmosphere will be determined in part by the duration of the calcining. Calcining as described elsewhere herein carried on for up to about 5 hours, generally shows little or no cumulative effect of the reactive gases present.

In another embodiment the atmosphere is an essentially reducing atmosphere comprising a predominant amount of a reducing gas such as hydrogen, carbon monoxide, or a hydrocarbon such a butane, pentane, butene, mixtures of these or the like. Generally a suitable reducing atmosphere will be one comprising 50 to 100 mole percent of the reducing gas with the non-reducing portion being principally an inert gas as described above.

In the case of some metal ferrites halogen can be present in the atmosphere, for example, the ferrites of manganese and magnesium. The exact function of the halogen is not fully understood. Apparently, the halogen catalyzes the formation of manganese and magnesium ferrites.

The halogen may be present in any suitable form wherein the halogen can be in intimate contact with the reactants during ferrite formation. The halogen may be present in the reaction atmosphere as molecular halogen or a volatile halogen compounds such as $HX_2$ or $NH_4X$. However, a preferred method is to introduce the halogen by way of a solid inorganic compound which at least partially decomposes during ferrite formation. Metal or metalloid halides are satisfactory sources of the halogen. Manganese, magnesium, or iron halide (or hydrates thereof) are entirely satisfactory and desirable because manganese, magnesium, and iron are components of the respective ferrite. Generally the halogen will be chlorine, bromine or iodine with chlorine being the preferred halogen. Suitable sources of halogen are such as $Cl_2$, $Br_2$, $I_2$, HCl, HBr, HI, $NH_4Cl$, alkyl halides containing one to six carbon atoms such as methyl chloride, halohydrins such as ethylene chlorhydrin, halo-substituted aliphatic acids such as chloroacetic acid, organic amine halide salts of the general formula $R_3N\cdot HX$ wherein R is a hydrocarbon radical containing from one to eight carbon atoms such as methyl amine hydrochloride or hydrobromide and other halogen compounds such as $MnCl_4\cdot MnCl_2\cdot 4H_2O$, $MnCl_3$, $MnBr_3$, $MnI_2$, $MnI_2\cdot 4H_2O$, $MgCl_2$ $MgBr_2$, $FeBr_2$, $FeBr_3$, $FeBr_3\cdot 6H_2O$, $Fe(ClO_4)_2\cdot 6H_2O$, $FeCl_2$, $FeCl_2\cdot 2H_2O$, $FeCl_2\cdot 4H_2O$, $FeCl_3\cdot 6H_2O$, $FeF_2$, $CCl_4$ and the like.

Generally, halide compounds will be used which require a temperature of no greater than 450° C to exert a vapor pressure of at least 1 mm of Hg at atmospheric pressure. Data showing the temperature necessary to achieve 1 mm of Hg vapor pressure of various metal halides may be found on pages 540–550 of Industrial and Engineering Chemistry, Vol. 39, No. 4 (Apr. 1947) which article is incorporated herein by reference. However, halogen compounds other than those listed in that reference are useful according to this invention. Ordinarily, the halogen compound will have from zero to eight carbon atoms and will have a molecular weight of less than 750. As mentioned, the function of the halogen is not fully understood. Furthermore, the actual mechanism during the reaction is also not fully understood. However, it is generally thought to be desirable to have the halogen present in an amount of from 0.0001 to 1.0 mols of halogen (calculates as mols of halogen, $X_2$) per atom of iron present in the ferrite reactants. This halogen may be present either in the solid phase, volatile phase or combinations thereof. Generally speaking, the vapor atmosphere present during ferrite formation (which is considered at the temperature at which ferrite can first be detected and usually will be at a temperature of at least 250° C to 350° C) will contain from 0.0001 to 3 mol percent of halogen (calculated as mols percent of X)), and preferably from 0.01 to 1 mol percent of the atmosphere. These ratios may be varied somewhat depending upon reaction conditions, and other considerations as stated herein.

Desired ferrites may be obtained by conducting the reaction to form the ferrite at relatively low temperatures, that is, at temperatures lower than some of the very high temperatures used for the formation of some of the semi-conductor applications. The temperature used for ferrite formation may be varied, depending somewhat upon the particular starting materials and upon the type of reaction atmosphere utilized, but it is a feature of this invention that relatively low temperatures are used. Speaking generally, higher temperatures may be employed to prepare the metal ferrite composition if an atmosphere as described in the invention is employed. For example, higher temperatures might be tolerated using nitrogen rather than air as the reaction atmosphere, generally the maximum temperature will be less than 1300° C and preferably less than 1150° C. At any rate, superior compositions are produced at temperatures of from high enough to form the ferrite generally at least about 250° C to 1000° C or less. Still better compositions are ordinarily produced at temperatures of less than 870° C and excellent metal ferrites are produced at temperatures of less than 700° C. Suitable temperatures of reaction are such as between about 400° to 1000° C, with a preferred range being from between about 450° to 900° C.

Another factor in producing superior compositions is the rate of heating of the reactants to form the ferrite. Here again, the rate of heating will be dependent upon the particular reactants, their ratios and the like, but better results are generally obtained when the reactants are heated at a rate of no greater than about 250° C per minute and still better results are ordinarily obtained when the rate is no greater than about 100° C per minute.

The length of time for heating the reactants to form the ferrite will vary depending upon such as the particular reactants used, their ratios and heating rate.

Suitably, the heating will be stopped reasonably shortly after a major portion of ferrite is formed. We have discovered that when precursors of the metal oxide or iron oxide are the reactants, e.g., when manganese carbonate is the starting compound, usually better results are obtained if the heating rate is controlled such that at least the major portion of the precursor has been decomposed to the oxide prior to substantial ferrite formation. This may be accomplished by slowly heating to decompose the precursor and thereafter increasing the temperature for ferrite formation.

Improved ferrites result when there is intimate mixing of the ingredients prior to or during ferrite formation. Along this same line it has been discovered that the reactants should preferably be finely divided such as passing through a 6 mesh U.S. Standard screen.

Ferrite formation may be accomplished by reacting an active compound of iron with an active compound of the designated metals. By active compound is meant a compound which is reactive under the conditions to form the ferrite. The metal and iron starting materials will suitably be any compounds that will form metal ferrite and generally will be precursors of metal oxide and iron oxide under the conditions to form the ferrite. It is believed that compounds other than oxides are converted to oxides during the formation of the ferrite, but this may not necessarily be true. For example, managenese carbonate or oxalate is probably converted to manganese oxide prior to or during ferrite formation. Starting materials may be such as oxides, hydroxides or salts including oxalates, acetates, carbonates, formates, sulfates, nitrates, halides, hydrates and so forth. Suitable metal or iron compounds are such as magnesium oxalate, manganese oxalate, calcium hydroxide, strontium nitrate, zinc carbonate, nickel oxide, the metal salts of aliphatic monocarboxylic acids of one to five carbon atoms, the metal sulfates, salts of aliphatic alcohols of one to five carbon atoms, hydrates thereof, the corresponding iron compounds such as $Fe_2O_3$ and mixtures thereof. Suitably, the iron will have a valence predominantly of +3 after the ferrite is formed.

The ferrite composition may be reduced with a reducing gas, e.g. prior to use in the process of dehydrogenation. Examples of reducing gases are hydrogen or hydrocarbons. For example, the manganese ferrite compositions may be reduced with, e.g., hydrogen at a temperature of at least 250° C with the temperature of reduction generally being no greater than 850° C. By reducing gas is meant a gas that will react with oxygen under the conditions of reduction. However, it is one of the advantages of this invention that the metal ferrites prepared according to this invention may not require reduction prior to use in the dehydrogenation reaction.

The catalyst of this invention may be applied to the dehydrogenation of a great variety of organic compounds to obtain the corresponding unsaturated derivatives thereof. Such compounds normally will contain from two to 20 carbon atoms, at least one

grouping, a boiling point below about 350° C. and such compounds may contain other elements, in addition to carbon and hydrogen such as oxygen, halogens, nitrogen and sulphur. Preferred are compounds having from two to 12 carbon atoms, and especially preferred are compounds of two to six or eight carbon atoms.

Among the types of organic compounds which may be successfully dehydrogenated to the corresponding unsaturated derivative by means of the novel process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2-or 3-chlorobutene-1 or 2, 3-dichlorobutane to chloroprene, ethyl pyridine, ethyl benzene to styrene, isopropyl-benzene to α-methyl styrene, ethylcyclohexane to styrene, cyclohexane to benzene, ethane to ethylene, propane to propylene, isobutane to isobutylene, n-butane to butene and butadiene-1,3, butene to butadiene-1,3 and vinyl acetylene, methyl butene to isoprene, cyclopentane to cyclopentane and cyclopentadiene-1,3, n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials which are dehydrogenated by the novel process of this invention include ethyl toluene, alkyl chlorobenzenes, ethyl napthalene, isobutyronitrile, propyl chloride, isobutyl chloride, ethyl fluoride, ethyl bromide, n-pentyl iodide, ethyl dichloride, 2,3-dichloride, 2,3-dichlorobutane, 1,3-dichlorobutane, 1,4-dichlorobutane, the chlorofluoroethanes, methyl pentane, methylethyl ketone, diethyl ketone, n-butyl alcohol, methyl propionate, and the like. This invention is particularly adapted to the preparation of vinylidene compounds containing at least one

group, that is, a group containing a terminal methylene group attached by a double bond to a carbon atom, and having two to 12 carbon atoms by the dehydro-genation of compounds of the formula CH$_3$—CH$_2$—R wherein R is an organic radical of from zero to 10 carbon atoms, preferably a hydrocarbon. Similarly, acetylenic compounds of the formula CH ≡ C—may be produced from the same starting materials.

Preferably oxygen is employed, suitably in an amount within the range of 0.2 to about 5.0 mols of oxygen per mol of organic compound to be dehydrogenated, preferably from 0.2 to 2.5 mols per mol. Generally, better results may be obtained if the oxygen concentration is maintained between about 0.25 and about 1.6 mols of oxygen per mol of organic compound to be dehydrogenated, such as between 0.35 and 1.2 mols of oxygen. The oxygen may be fed to the reactor as pure oxygen, as air, as oxygen-enriched air, oxygen mixed with diluents, and so forth. Based on the total gaseous mixture entering the reactor, good results are obtained with oxygen present in an amount from about 0.5 to 25 volume percent of the total gaseous mixture, such as in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam. It is also within the scope of this invention to employ the described ferrite compositions as the partial or sole source of oxygen used for oxidative dehydrogenation. For example, the manganese compositions may release oxygen to react with the organic compound during a dehydrogenation step and thereafter the manganese composition is regenerated by oxidation prior to another step where oxygen is released. Preferably such a process will have the manganese composition present as a moving bed.

It is one of the advantages of this invention that halogen may also be added to the reaction gases to give excellent results. The addition of halogen to the feed is particularly effective when the hydrocarbon to be dehydrogenated is saturated. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds, especially the ammonium compounds, being particularly preferred. When terms such as halogen liberating materials or halogen materials are used in the specification and claims, this includes any source of halogen such as elemental halogens, hydrogen halides, or ammonium halides. The amount of halogen calculated as elemental halogen, may be as little as about 0.0001 or less mol of halogen per mol of the organic compound to be dehydrogenated to as high as 0.2 or 0.5. The preferred range is from about 0.001 to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 650° C or 750° C. or perhaps higher such as 900° C under certain circumstances. However, excellent results are obtained within the range or about 300° C to 575° C., such as from or about 325° C to or about 525° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The initial partial pressure of the organic compound to dehydrogenated will preferably be equivalent to equal to or less than one-half atmosphere at a total pressure of one atmosphere. Generally, the combined partial pressure of the organic compound to be dehydrogenated, together with the oxygen in gaseous phase will also be equivalent to less than one-half atmosphere at a total pressure of one atmosphere. Preferably, the initial partial pressure of the organic compound to be dehydrogenated will be equivalent to no greater than one-third atmosphere or no greater than one-fifth atmosphere at a total pressure of one atmosphere. Reference to the initial partial pressure of the organic compound to be dehydrogenated means the partial pressure of the organic compound as it first contacts the catalytic particles. An equivalent partial pressure at a total pressure of one atmosphere means that one atmosphere total pressure is a reference point and does not imply that the total pressure of the reaction must be operated at atmospheric pressure. For example, in a mixture of one mol of ethyl chloride, three mols of steam, and one mol of oxygen under a total pressure of one atmosphere, the ethyl chloride would have an absolute pressure of one-fifth of the total pressure, or roughly 6 inches of mercury absolute pressure. Equivalent to this 6 inches of mercury absolute pressure at atmospheric pressure would be ethyl chloride mixed with oxygen under a vacuum such that the partial pressure of the ethyl chloride is 6 inches of mercury absolute. The combination of a diluent such as nitrogen, together with the use of a vacuum, may be utilized to achieve the desired partial pressure of the organic compound. For the purpose of this invention, also equivalent to the 6 inches of mercury ethyl chloride absolute pressure at atmospheric pressure would be the same mixture of one mol of ethyl chloride, three mols of steam, and one mol of oxygen under a total pressure greater than atmospheric, for example, a total pressure of 20 p.s.i.a. Thus, when the total pressure in the reaction zone is greater than one atmosphere, the absolute values for the pressure of the organic compound to be dehydrogenated will be increased in direct proportion to the increase in total pressure above one atmosphere.

Preferably, the reaction mixture contains a quantity of steam, with the range generally being between about two and 40 mols of steam per mol of organic compound to be dehydrogenated. Preferably, steam will be present in an amount from about three to 35 mols per mol of organic compound to be dehydrogenated and excellent results have been obtained within the range of about five to about 30 mols of steam per mol of organic compound to be dehydrogenated. The functions of the steam are several-fold, and the steam may not merely act as a diluent. Diluents generally may be used in the same quantities as specified for the steam.

The gaseous reactants may be conducted through the reaction chamber at a fairly wide range of flow rates. The optimum flow rate will be dependent upon some variables as the temperature of reaction, pressure, particle size, and whether a fluid bed or fixed bed reactor is utilized. Desirable flow rates may be established by one skilled in the art. Generally the flow rates will be within the range of about 0.10 to 25 liquid volumes of the organic compound to be dehydrogenated per volume of dehydrogenation zone containing catalyst per hour (referred to as LHSV), wherein the volumes of organic compound are calculated at standard conditions of 0° C. and 760 mm. of mercury. Usually, the LHSV will be between 0.15 and about 5 or 10. For calculation, the volume of reactor containing catalyst is that volume of reactor space including the volume displaced by the catalyst. For example, if a reactor has a particular volume of cubic feed of void space, when that void space is filled with catalyst particles, the original void space is the volume of reactor containing catalyst for the purpose of calculating the flow rate. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6400, and excellent results have been obtained between about 38 and 3800. Suitable contact times are, for example, from about 0.001 or higher to about 4 or 10 or 25 seconds, with particularly good results being obtained between 0.01 and 5 seconds. The contact time is the calculated dwell time of the reaction zone, assuming the mols of product mixture are equivalent to the mols of feed mixture. For the purpose of calculation of contact times, the reaction zone is the portion of the reactor containing catalyst which is at a temperature of at least 250° C.

Catalyst binding agents or fillers may be used, but these will not ordinarily exceed about 50 percent or 60 percent by weight of the catalytic surface, and the described catalytic compositions will preferably constitute the main active constituent. These binding agents and fillers will preferably be essentially inert. Preferred catalysts are those that have as a catalytic surface exposed to the reaction gases at least 25 or preferably 50 weight percent of the defined catalytic surface. Also preferably iron will constitute at least 50 atomic weight percent of the cations in the catalytic surface. Suitable catalysts are those which do not contain sodium or potassium as an additive in the crystal structure, such as those containing less than 5 or less than 2 percent by weight of sodium or potassium based on the total weight of the catalyst. This is particularly true for processes that do not utilize halogen in the dehydrogenation zone.

The dehydrogenation reactor may be of the fixed bed or fluid bed type. Conventional reactors for the production of unsaturated organic compounds by dehydrogenation are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material.

Typical of the dehydrogenations in which the present catalyst can be employed are those shown in U. S. Patents Nos.: 3,270,080; 3,284,536; 3,303,234; 3,303,235; 3,303,236; 3,303,238; 3,308,182; 3,324,195; 3,334,152; 3,342,890; 3,398,100; 3,450,787; 3,420,911; 3,420,912; 3,428,703 and 3,440,299.

In the following examples the conversions, selectivities and yields are reported in mol percent. Otherwise, all percentages are weight percent unless expressed to the contrary.

EXAMPLE 1

The reactor used consists of two 23 ½ inch electric combustion furnaces mounted vertically one over the other about three inches apart. Each unit is capable of independent temperature control. Each of the two furnaces houses a 24 × 1 inch I.D., 316 stainless steel tube. These two tubes are joined by a common connection located between the two furnaces. The top tube contains 6 × 6 mm Vycor* (*Vycor is the trademark of Corning Glass and is comprised approximately of 96 percent silica with the remainder being essentially $B_2O_3$.) raschig rings and is used to vaporize, mix and preheat reactants and/or diluents before they pass downflow over the catalyst bed contained in the bottom tube of the reactor system. The bottom tube contains 125 cc of catalyst. Vycor raschig rings (6×6 mm) are used to support the catalyst as a desired level in the tube and also to fill any void space remaining in the tube above the level of the top of the catalyst bed. The temperature of the catalyst bed is measured with thermocouples inserted into a ¼ inch, 316 ss thermowell located inside and coaxial with the reaction tube.

A manganese ferrite catalyst was prepared from 734 gms of hydrated yellow ferric oxide, 533 gms of manganous carbonate, and 20 gms of $MnCl_2.4H_2O$. These ingredients were thoroughly mixed in distilled water and the resulting slurry dried below 100° C. The dried cake was broken up, powdered and then heated to form the ferrite to about 575° C in a Vycor reaction tube with nitrogen passing through the tube as a diluent (passage of 100 volumes of nitrogen/volume of catalyst/hour.) The resulting reddish-brown powder was shown to be manganese ferrite by X-ray diffraction analysis.

This ferrite material was deposited as 35 percent actives on a 7–8 mesh fused alundum support (Carborundum Company type AMC.) Isoamylenes (86–88 mol percent 2-methyl-butene-2 + 7–8 mol percent 2-methyl-butene-1, oxygen (as air) and steam were then fed in a molar ratio of 1.0, 0.7 and 30, respectively, over a 125 cc bed of the catalyst. The isoamylenes were fed at a liquid hourly space velocity (LHSV) of 1.5 (LHSV is based on the volume of liquid hydrocarbon fed/volume of catalyst/hour.) At a reaction temperature of 460° C. 55 percent of the isoamylenes were oxidatively dehydrogenated to a 51 percent yield of isoprene. The reaction was conducted at atmospheric pressure.

EXAMPLE 2

Example 1 was repeated, with the the exception that the catalyst contains 2.5 atoms of iron per atom of manganese and the LHSV was decreased to 1.0.

EXAMPLE 3

A manganese ferrite catalyst was prepared according to the general procedure of Example 1 with an exception that the ferrite was formed at a temperature of 570° C. Butylenes (99 percent butene-2's), oxygen (as air) and steam were passed over a 125 cc catalyst bed of 25 percent actives deposited on 3–5 mesh fused alundum support (Carborundum Company type AMC). The butylenes were fed at an LHSV of 1.5. Oxygen and steam were fed at molar ratios of 0.50 and 15 per mol of hydrocarbon. Conversion of butylenes, at a reaction temperature of 475° C. was 56 percent; 1,3-butadiene was produced in a yield of 51 mol percent.

EXAMPLE 4

Example 3 was repeated, with the exception that the manganese ferrite was prepared by calcination to 1380° F. At a reaction temperature of 930° F, selectivity of converted butylenes to a product of butadiene was 91 percent.

EXAMPLES 5 – 12

Manganese ferrite was prepared as per Example 1. Using this catalyst and 0.05 mol of $Br_2$ (fed as $NH_4Br$) per mol of organic feed, the following runs were made:

| Ex. | Feed | Flow Rate LHSV | Max. Temp. °C | Gaseous Diluent[1] | Oxygen[2] | Product |
|---|---|---|---|---|---|---|
| 5 | Propio-nitrile | 1.0 | 450 | 15 Steam | 0.75 | acrylonitrile |
| 6 | 2-Chloro-butene-2 | 1.5 | 500 | 15 Steam | 0.50 | chloroprene |

| | | | | | |
|---|---|---|---|---|---|
| 7 | Isobutyronitrile | 1.0 | 525 | 20 Steam | 0.75 methacrylonitrile |
| 8 | Cyclohexene | 1.25 | 475 | 10 Nitrogen | 0.75 benzene |
| 9 | Ethylcyclohexene | 0.75 | 525 | 10 Helium | 1.0 styrene |
| 10 | 2,3dichlorobutane | 1.25 | 500 | 15 Steam | 0.75 chloroprene, 2-chlorobutene-2 |
| 11 | Isopentane | 1.0 | 475 | 5 Steam | 2.0 isoprene |
| 12 | Propionaldehyde | 1.25 | 425 | 15 Steam | 0.6 acrolein |

[1] Per mol of the compound to be dehydrogenated.
[2] Mols of oxygen (as air) per mol of the compound to be dehydrogenated.

EXAMPLE 13

A manganese ferrite catalyst was prepared by slurrying together: 0.49 mols of manganese carbonate, 0.50 mols of yellow hydrated iron (III) oxide and 0.01 mol of manganese chloride, hydrate. These ingredients were slurried together in water and then dried at 120° C. The dried reactants were placed in a Vycor combustion tube and reacted at 630° C in an atmosphere of nitrogen. The resulting manganese ferrite catalyst is deposited as 25 percent actives on 40–100 mesh fused alundum support (Carborundum Company type AEHF).

The reactor consists of an electric, multiple-unit, tube type combustion furnace (as the heat supply) surrounding a stainless steel (type 316) reactor tube. The reactor tube has a stainless steel frit, located in the lower quarter of the tube, for support of the catalyst. This frit is well within the lower heated zone of the furnace, thus allowing the tube space below the frit to act as a preheat zone. The catalyst is charged to the reaction tube above the frit and a conical shaped disengaging section is attached to the upper end of the tube. Hydrocarbons, air and steam are fed to the reactor below the frit where they are mixed and preheated. The preheated gases flow through the frit where they contact and fluidize a 120 cc charge of catalyst. After contact with the catalyst, the effluent gases exit from the reactor into a disengaging section where catalyst fines settle and are returned to the reactor tube. The gases then pass through a micro porous filter to remove any additional catalyst fines and, finally, are passed through a water cooled condenser where most of the steam is condensed. Samples of the effluent gases are collected for analysis after the steam has been removed.

Isoamylenes were fed to the reactor at an LHSV of 0.5. Oxygen (as air) and steam were fed to the reactor at a rate of 0.6 mols and 15 mols, respectively, per mol of hydrocarbon. Selectivity to isoamylenes, at 745° F, was about 89 percent.

EXAMPLE 14

Example 13 was repeated with butylene-2's being fed to the reactor at an LHSV of 0.5. Steam, 10 mols, and oxygen, 0.54 mols (as air), are fed to the reactor per mol of hydrocarbon. At a reaction temperature of 766° F, 54 percent of the butylenes were converted to reaction products; butadiene comprised 93 percent of the reaction products.

EXAMPLE 15

Example 13 was repeated using a hydrogen chloride vapor (same molar ratio of $Cl_2$) instead of manganese chloride during the initial preparation of the manganese ferrite.

EXAMPLE 16

Example 15 was repeated using the same mols of ferrous bromide as the halogen catalyst instead of manganese chloride.

EXAMPLE 17

Example 17 illustrates a process of dehydrogenation using a manganese ferrite produced in an oxidizing atmosphere. Example 18 illustrates the improvement when a non-oxidizing atmosphere is utilized during the formation of the manganese ferrite.

Manganese ferrite was prepared by reacting $MnCO_3$ and $Fe_2O_3$. 80.5 grams of $MnCO_3$ and 111.8 grams of $Fe_2O_3$ were dispersed in 400 cc of water and blended for 15 minutes. The mixture was then filtered and dried. The dried mixture was reacted at 800° C in an oxygen atmosphere to form manganese ferrite. Butene-2 was dehydrogenated to butadiene-1,3 employing the manganese ferrite. Oxygen was fed as air in an amount equivalent to 0.6 mol of oxygen per mol of butene-2. Steam was employed in an amount of 30 mols of steam per mol of butene-2. A fixed bed reactor was used with the liquid hourly space velocity of butene-2 being 1.0. The temperature in the reactor was about 400° C. The conversion of butene-2 is 47 mol percent, the selectivity to butadiene was 84 mol percent for a yield of 40 mol percent butadiene-1,3.

EXAMPLE 18

Example 17 was repeated with the exception that the reaction to form the ferrite was conducted in a helium atmosphere instead of in the presence of oxygen. The molar ratio of reactants were the same as in the preceding Example. At a reaction temperature of about 430° C the conversion of butene-2 was 54 mol percent and the selectivity to butadiene-1,3 is 86 mol percent for a yield of 46 mol percent of butadiene-1,3.

EXAMPLE 19–20

A Mg ferrite was prepared by slurring $Fe_2O_3.H_2O$, $MgCO_3$ and 2 wt. percent $MgCl.6H_2O$ to give a $Fe_2O_3/MgO$ weight ratio of about 4.4:1. The slurry was extruded, dried, milled, mixed with a 3 percent solution of 85 percent phosphoric acid, discharged into a California pellet mill, formed into 3/32 inch pellets, dried and calcined at 1590° F for 1 hour. The catalyst in Example 19 was calcined in air and in Example 20 in nitrogen. The catalysts prepared in this manner were compared under the same conditions as to dehydrogenation performance of butene-2 to butadiene-1,3. The runs were of 60 hours duration. The ratio of oxygen/butene-2 was 0.65:1. The ratio of steam/butene-2 was 15:1. The temperature, conversion, selectivity and yield (C/S/Y) are shown in the Table.

| | | Temperature of | | | | |
|---|---|---|---|---|---|---|
| Ex. | Catalysts | Inlet | Max | Δ | C/ | S/ | Y |

| | | | | | | | |
|---|---|---|---|---|---|---|---|
| 19 | Mg ferrite calcined in air | 675 | 1143 | 468 | 67.3 | 90.0 | 60.0 |
| 20* | Mg ferrite calcined in $N_2$ | 650 | 1093 | 443 | 71.8 | 91.6 | 65.8 |
| | | 700 | 1134 | 434 | 71.8 | 91.6 | 66.0 |

*Two runs only temperature was varied.

EXAMPLES 21–22

Manganese oxide and iron oxide were coprecipitated. The precipitated material was pelleted and a portion calcined in air at 700° C for 1 hour. A second portion was calcined in hydrogen at 500° C for 1 hour. Each catalyst was evaluated under identical conditions in a reactor. Butene-2 was oxidatively dehydrogenated over each catalyst under the following conditions:mol ratio butene-2 to steam to oxygen 1.0/20/0.5 and 1.0/20/0.75, LHSV= 1.5. The results are shown below:

| Example | Cat. Treatment | $O_2$ mol ratio: HC | $T_{int.}$ $T_{max}$ °F | C/S/Y mol % Butadiene |
|---|---|---|---|---|
| 21 | Air at 700° C | 0.5 | 810–820 | 60/95/57 |
| | Air at 700° C | 0.75 | 855–900 | 69/90/63 |
| 22 | $H_2$ at 500° C | 0.5 | 800–805 | 66/96/63 |
| | $H_2$ at 500° C | 0.75 | 820–830 | 78/92/71 |

What is claimed is:

1. A process for the oxidative dehydrogenation of organic compounds in vapor phase which comprises contacting the said organic compound in the presence of a composition comprising ferrites of metals selected from the group consisting of Mg, Zn, Ni, Co, Mn, Cu, Cd, Ca, Ba, Sr, Al, Cr, Ti, V, Mo, W, Na, Li, K, Zr, Ag, Sn, Pb, Sb, Bi, Ga, Ce, La, Th, other rare earth elements and mixtures thereof wherein the improvement comprises forming said ferrite at a temperature in the range high enough to form ferrites to 1300° C. in an atmosphere containing less than 20 mol percent oxygen.

2. The process according to claim 1 wherein the atmosphere contains less than 15 mol percent oxygen.

3. The process according to claim 1 wherein the atmosphere is essentially inert.

4. The process according to claim 1 wherein the atmosphere contains up to 3 mol percent of a gas selected from the group consisting of an oxidizing gas, a reducing gas and mixtures thereof.

5. The process according to claim 1 wherein the atmosphere consists essentially of an inert gas selected from the group consisting of nitrogen, helium, neon, argon, krypton, xenon, radon and mixtures thereof.

6. The process of claim 1 wherein the said ferrite is formed at a temperature of from 250° to 1000° C.

7. The process of claim 1 wherein the said ferrite is formed at a temperature of up to 900° C.

8. The process according to claim 1 wherein the metal is selected from the group consisting of Mg, Ca, Sr, Ba, Mn, Cr, Co, Ni, Zn, Cd and mixtures thereof.

9. The process according to claim 8 wherein the atmosphere contains less than 15 mol percent oxygen.

10. The process according to claim 8 wherein the atmosphere is essentially inert.

11. The process according to claim 8 wherein the atmosphere contains up to 3 mol percent of a gas selected from the group consisting of an oxidizing gas, a reducing gas and mixtures thereof.

12. The process according to claim 2 wherein the ferrite comprises magnesium ferrite.

13. The process according to claim 12 wherein the atmosphere is essentially inert.

14. The process according to claim 12 wherein the atmosphere contains up to 3 mol percent of a gas selected from the group consisting of an oxidizing gas, a reducing gas and mixtures thereof.

15. The process according to claim 12 wherein the temperature is in the range of about 450° to 900° C.

16. The process according to claim 12 wherein halogen is present during the formation of the ferrite.

17. The process according to claim 2 wherein the ferrite comprises manganese ferrite.

18. The process according to claim 17 wherein the atmosphere is essentially inert.

19. The process according to claim 17 wherein the atmosphere contains up to 3 mol percent of a gas selected from the group consisting of an oxidizing gas, a reducing gas and mixtures thereof.

20. The process according to claim 18 wherein the atmosphere consists essentially of an inert gas selected from the group consisting of nitrogen, helium, neon, argon, krypton, xenon, radon, and mixtures thereof.

21. The process according to claim 17 wherein the temperature is in the range of about 250° to 1000° C.

22. The process according to claim 17 wherein the temperature is in the range of up to 900° C.

23. The process according to claim 17 wherein the atmosphere consists essentially of nitrogen.

24. The process according to claim 17 wherein halogen is present during formation of the ferrite.

25. The process according to claim 1 wherein the metal is a divalent metal ion mixture of divalent metal ions with an ionic radius approximately between 0.5 and 1.1A.

26. The process according to claim 1 wherein the ionic radius of the metals is between 0.6 and 1.0A.

27. The process according to claim 1 wherein the atmosphere is essentially reducing.

28. The process according to claim 1 wherein the ferrite comprises zinc ferrite.

29. The process according to claim 1 wherein the said organic compound is a hydrocarbon having two to eight carbon atoms.

30. The process according to claim 1 wherein the said organic compound comprises n-butene, isoamylene and mixtures thereof.

31. The process of claim 1 wherein the said ferrite has been formed by reacting a member selected from the group consisting of ferric oxide and hydrated ferric oxide with a member selected from the group consisting of oxides, hydroxides and salts of said metals.

32. The process of forming catalysts comprising metal ferrites of metals selected from the group consisting of Mg, Zn, Ni, Co, Mn, Cu, Cd, Ca, Ba, Sr, Al, Cr, Ti, V, Mo, W, Na, Li, K, Zr, Ag, Sn, Pb, Sb, Bi, Ga, Ce, La, Th, other rare earth elements and mixtures thereof for use as catalysts in oxidative dehydrogenations comprising forming said ferrite at a temperature in the range high enough to form ferrites to 1300° C. in a suitable atmosphere wherein the improvement comprises using an atmosphere containing less than 15 mol percent oxygen.

33. The process of claim 32 wherein the temperature is 1000° C. or less.

34. The process of claim 32 wherein the temperature is in the range of about up to 900° C.

* * * * *

PO-1050
(5/69)

UNITED STATES PATENT OFFICE
CERTIFICATE OF CORRECTION

Patent No. 3,686,347      Dated Aug. 22, 1972

Inventor(s) Johnny C. Dean and Philip M. Colling

It is certified that error appears in the above-identified patent and that said Letters Patent are hereby corrected as shown below:

Col. 2, line 51, please delete "$Ni_{0.25}Mg_{0.25}Mg_{0.75}Fe_2O_4$" and insert therefor -- $Ni_{0.25}Mg_{0.75}Fe_2O_4$ --.
Col. 3, line 47 reads "$Me_aCr_bFebgcO_4$" but should read -- $Me_aCr_bFe_cO_4$ --.
Col. 6, line 61, please delete "$MgCl_2MgBr_2$," and insert therefor -- $MgCl_2$, $MgBr_2$ --.
Col. 6, line 62, please delete ", $Fe(ClO_4)_2 \cdot 6H_2O$," and insert therefor -- , $Fe(ClO_4)_2 \cdot 6H_2O$, --.
Col. 6, line 63, please delete "$FeCl_2 \cdot 2H2O$," and insert therefor -- $FeCl_2 \cdot 2H_2O$, --.
Col. 6, line 64, after "...and the like." please add -- The preferred compounds are any of the manganese chlorides and hydrates thereof.--.
Col. 7, line 17, reads "the ferrite reactants." but should read -- "the manganese or magnesium ferrite reactants."--.
Col. 9, line 25 reads "cyclopentane to cyclopentane" but should read -- cyclopentane to cyclopentene --.
Col. 9, lines 56 & 57 reads "dehydro-gena-tion" but should read -- dehydrogenation --.

Signed and sealed this 8th day of May 1973.

(SEAL)
Attest:

EDWARD M. FLETCHER, JR.
Attesting Officer

ROBERT GOTTSCHALK
Commissioner of Patents